United States Patent [19]
Nagel et al.

[11] Patent Number: 5,592,549
[45] Date of Patent: Jan. 7, 1997

[54] METHOD AND APPARATUS FOR RETRIEVING SELECTED INFORMATION FROM A SECURE INFORMATION SOURCE

[75] Inventors: Robert Nagel; Thomas H. Lipscomb, both of New York, N.Y.

[73] Assignee: Infosafe Systems, Inc., New York, N.Y.

[21] Appl. No.: 491,531

[22] Filed: Jun. 15, 1995

[51] Int. Cl.$^6$ .................................................. H04L 9/00
[52] U.S. Cl. ............................................ 380/4; 380/25
[58] Field of Search ........................................ 380/4, 25

[56]     References Cited

U.S. PATENT DOCUMENTS

| | | | |
|---|---|---|---|
| 4,827,508 | 5/1989 | Shear | 380/4 |
| 4,977,594 | 12/1990 | Shear | 380/4 |
| 5,010,571 | 4/1991 | Katznelson | 380/4 |
| 5,023,907 | 6/1991 | Johnson et al. | 380/4 |
| 5,027,398 | 6/1991 | Miyoshi | 380/4 |
| 5,050,213 | 9/1991 | Shear | 380/4 |
| 5,204,897 | 4/1993 | Wyman | 380/25 |
| 5,212,728 | 5/1993 | Glover et al. | 380/4 |
| 5,247,575 | 9/1993 | Sprague et al. | 380/4 |
| 5,287,408 | 2/1994 | Samson | 380/25 |
| 5,295,187 | 3/1994 | Miyoshi | 380/4 |
| 5,367,593 | 11/1994 | Quimby | 380/25 |
| 5,390,297 | 2/1995 | Barber et al. | 380/25 |
| 5,394,469 | 2/1995 | Nagel et al. | 380/4 |
| 5,398,285 | 3/1995 | Borgelt et al. | 380/4 |

*Primary Examiner*—Salvatore Cangialosi
*Attorney, Agent, or Firm*—Furgang & Milde, L.L.P.

[57]            ABSTRACT

A device is disclosed for retrieving information from a secure electronic information source, wherein at least some of the information is in encrypted form and may be decrypted for use. The device comprises:

(a) a computer, having an input device and a display device, for selecting information to be retrieved from the information source;

(b) an information retrieval device, coupled to the computer, for retrieving the selected information from the information source;

(c) a decryption device, coupled to the computer, for decrypting at least portions of the selected information retrieved from the information source; and (d) a data logging device, coupled to the computer, for maintaining a data log of the selected information as it is retrieved from said information source and decrypted. According to the invention, a unique brand code is automatically, electronically added to at least some of the selected and decrypted information, and to the data log.

20 Claims, 8 Drawing Sheets

METHOD AND APPARATUS FOR RETRIEVING SELECTED INFORMATION FROM A SECURE INFORMATION SOURCE

BACKGROUND OF THE INVENTION

The present invention relates to a system (method and Apparatus) for retrieving selected information from a secure information source for temporary storage and usage by Systems for storage and retrieval of selected information from a secure information source are well in the art. As used herein, the ten "secure source" is intended to mean any source of information (alphanumeric data, graphics, software and the like) in which the information is either encrypted or otherwise protected to access thereto except by an authorized user. Such systems have been proposed and are employed both for the case where the information source (e.g., database) is centralized, and for the case where the information source bas been distributed to multiple users. In the latter case, portable mass storage media, such as CD-ROMs, have been used to export databases or other information to multiple users so that information storage and retrieval takes place at the user site. In this case, the information can be directly from the portable media, or downloaded from such media to large, fast access storage media, such as a DASD, for subsequent retrieval. Alternatively, the secure information can be distributed to local sites for storage there by telephone lines, satellite broadcast or the like.

As used herein, the term "encrypted" is intended to mean and include any means or method of changing information to make this information unreadable or unusable if supplied to a user. Conversely, the term "decrypted" is intended to mean and include any means or method of changing encrypted information to render it readable or usable by a user.

In the U.S. Pat. No. 5,010,571 to Ron Katznelson and the U.S. Pat. Nos. 4,827,508, 4,977,594 and 5,050,213 to Victor Shear, it is proposed to provide encrypted digital information on CD-ROMs at the user site and to monitor and account for each item or "packet" of information which is retrieved and decrypted from a CD-ROM by an authorized user.

This concept of retrieving information on a "pay-as-you-go" basis is also disclosed in the U.S. Pat. No. 5,247,575 of Peter J. Sprague and Thomas H. Lipscomb to include individual access to encrypted data which is "broadcast" to multiple user sites from a central source and/or to provide individual access to encrypted data stored at a central source, using conventional time sharing techniques and transmission via telephone dial-up or local area network (LAN) or wide area network (WAN) communication.

U.S. patent application Ser. No. 5,394,469 of Robert Nagel and Thomas H. Lipscomb discloses a personal computer or "host computer" a CD-ROM reader and a "decryption controller". The decryption controller is addressable by the host computer as if it were the CD-ROM reader. Upon receipt of an information request, the decryption controller initiates a request to the CD-ROM reader for the desired information, retrieves this information, decrypts it (if it is encrypted) and then passes it to the host computer. The decryption controller is thus "transparent" to the host computer.

All of these prior art systems permit the user's access to the secure information to be monitored and strictly controlled. This is accomplished, in practice, by maintaining a record at each user site of both the identity and cost of each item of information which is retrieved, and then "polling" all user sites from a remote central computer, on a regular basis, to retrieve the user data and, if necessary, disable the equipment at one or more user sites to prevent further access to the secure information at these sites.

These prior art systems include specialized electronic circuitry at each user site which operates in cooperation with the central computer at the remote site. Typically, the electronic circuitry at the user site includes a modem and telephone interface connected to the public telephone network. The central computer "calls" each user site at periodic intervals, such as once each day, week or month, to retrieve the user data. The central computer also determines whether the user has sufficient funds in the user's deposit account to permit continued access to the encrypted data. If not, the electronic circuitry at the user site is disabled. If the funds in the deposit account have fallen below a prescribed threshold, a warning notice and invoice may be mailed to the user.

Systems of the type described above are well known and have been operated successfully for several years. Such systems provide business auditing and billing services for "digital information sources"—that is, owners and providers of digital information—enabling such information sources to provide to their customers access to their encrypted digital information and to charge for and audit the use of such information. The systems thus provide an effective "technical solution" to the problem of unauthorized copying of proprietary—e.g., copyrighted—digital information.

While systems of this type are extremely secure, they must necessarily eventually provide the digital information in decrypted or cleartext form. Once the information has been decrypted and made available to the user, the user has access to it indefinitely and can reproduce it any number of times.

The problem of unauthorized copying a decrypted or cleartext information is a familiar one to information providers. For example, the publisher of a trade journal or magazine well knows that a single issue or subscription will be circulated among a large number of readers and that each reader may, and often does, photocopy one or more articles for further distribution to multiple readers. As a result, the information provider must set an artificially high subscription fee since the number of paid subscriptions to the trade journal represents only a small fraction of the total number of readers of articles in this journal.

Clearly, legal restrictions based on the copyright law are not effective to curb and protect against such unauthorized copying of the published information.

The U.S. patent application Ser. No. 08/174,741 of Thomas H. Lipscomb and Robert Nagel discloses a system, of the type described above, wherein packets of digital information are stored in encrypted form and then decrypted as the user requires. As each informational data packet is read from the secure storage medium and decrypted, it is expanded in length to form a sequence of digital data which is so large as to be inconvenient for permanent storage. For this reason, the information user will be inclined to delete the information packet from electronic storage—that is, "throw it away"—rather than use valuable storage space to maintain the expanded record. If this information packet is again desired at a later date, the user will retrieve it again from the secure information source, paying the relatively nominal charge imposed by the information provider.

As far as is known, this system is the only technique, developed thus far, for handling cleartext information in such a way as to inhibit unauthorized copying. While the system is robust and effective in practice, it requires some extra computation time and necessarily utilizes a large amount of storage space. For large, high speed computers, such computation time and storage space are insignificant; for small, inexpensive personal computers, such computation time and storage space may be extremely inconvenient.

SUMMARY OF THE INVENTION

A principal object of the present invention is to provide a method which discourages and inhibits unauthorized storage and retrieval (copying) of unsecure (e.g., cleartext) information which has been electronically retrieved by an authorized user from a secure information source.

A further object of the present invention is to provide a system for electronic retrieval of selected items of information from a secure information source in such a way as to discourage unauthorized use of these items of information.

It is a further object of the present invention to provide a system for discouraging electronic storage of unsecure (e.g., decrypted, cleartext) information for continued and continuous availability to an information user.

These objects, as well as further objects which will become apparent from the discussion that follows, are achieved with the aid of apparatus which comprises:

(a) a control device, such as a microprocessor or a computer, for selecting information to be retrieved from the secure information source;

(b) an information retrieval device, such as a magnetic storage or CD-ROM reader, coupled to the control device, for retrieving the selected information from the secure information source;

(c) a decryption device, such as a DES integrated circuit chip and its related circuitry, for decrypting at least portions of the selected information retrieved from the secure information source; and (d) a data logging device, such as a random access memory with its associated circuitry, for maintaining a data log of the selected information as it is retrieved from the secure information source and decrypted.

According to the invention, a unique code, for example of alphanumeric characters, is automatically, electronically added to the selected and retrieved information and to the data log. The code assigned to the retrieved information thus becomes a "brand" which is carried along with the information wherever it is stored.

Thereafter, if two items of information are found with the same brand code, one of these information is clearly an unauthorized copy. Appropriate action can then be taken by the licensor of the information packet—i.e., the information provider.

Preferably, the data logging device logs several items of data each time that selected information is retrieved and decrypted. Such items of data may include:

TABLE I

Name of the user of the information retrieval system
Time and date
Identity of the retrieved information
License fee for the retrieved information
Brand code applied to the retrieved information This data is stored and accumulated in the data logging device as selected information is retrieved. This logged data is maintained in the data logging device until it is downloaded to a remote central computer, for example, via the telephone network.

The data logging device may initiate a call when some criterion, such as a total maximum charge, is met, or the data logging devices at different sites may be polled by the remote central computer on a periodic basis. Once downloaded to the central computer, the unique brand code assigned to each item of retrieved information may be retained as a permanent record or transmitted to the owner or provider of this information.

A key feature of the present invention is that the brand code assigned to each retrieved and decrypted information is automatically supplied to a central computer and/or the information provider. In this way, the user of the information is not required to take positive steps, such as mailing a postcard, to provide this code making it easy for the user to avoid this responsibility.

Another important feature of the present invention is that the brand code is applied to the retrieved and decrypted information in such a way that it cannot be easily detected and removed. For example, the brand code may be added to the item of information somewhere between the beginning and the end thereof, so that its location is not readily identifiable. Alternatively, the brand code may be added at a plurality of locations within the information item or, if the information item has a plurality of sections, it may be added to each of the sections. Preferably also, an error detecting code, such as a checksum, is added to the information item with the brand code so that it will be possible to determine whether the brand code has been removed or changed.

More particularly, the brand code may be added to an information item at a standard location (e.g., in the header) or at a non-standard, secret location known only to the information provider. Similarly, the error detecting code may be located at a standard location, or at a secret location within the information item. The brand code may, in fact, be an error detection code which is added to the information item.

It is of course preferable if the printed or visible version of the information item—which may be a font, graphics or alphanumeric text—not include the brand code.

The brand code itself is preferably a series of alphanumeric characters. For example, the brand code may be a serial number, successively assigned, or it may be the date and time of retrieval of the information item with which it is associated.

If the information item is to be used with an application program, such as a word processing program, it is preferable if both the brand code of the information item and the serial number of the application program be logged and transmitted to the central computer. In this way, the information item—which may, for example, be a particular type font—must remain connected with the application program—which may be a word processor.

To some extent, the application of a brand code to retrieved and decrypted items of information serves as a psychological barrier against copying since a user who is aware of the branding method knows that such copying may be traced, uncovered and readily proven. According to another aspect of the present invention, another psychological barrier may be provided by offering the user a choice from among a plurality of use licenses; for example, (1) a single site license for the one time use of an information and (2) at least one additional, expanded license which permits the user more flexibility in his or her use of the information. By thus offering to tailor a license to the needs of the user, the user will be encouraged to consciously select the use license commensurate with his or her needs.

According to this aspect of the invention, therefore, the computer at the user site comprises an input device, such as a keyboard, as well as an image display, such as a CRT, as well as the usual CPU and random access storage. As indicated previously, this system further includes an information retrieval device for retrieving selected information from the storage media; a decryption device for decrypting portions of the selected information and a data logging device for maintaining a log of the selected information as it is retrieved.

According to the invention, the system user is required to enter into the input device his or her selection of a use license ("site license") from among a plurality of use licenses which are available for the selected item of information. Only after such selection is made, will the apparatus permit access by the user to the selected information. Once the use license is selected and entered into the input device, the fee for this selected use license is added to the data log in association with the identity of the selected information.

In a preferred embodiment of the invention, at least two different use license fees are stored in association with one or more items of information. A first, and lowest fee is for a single site use license and a second, higher fee is for an expanded use license. Thereafter, when an information item is retrieved, the use fees associated therewith are displayed for selection of a use license by the computer user. After the user responds by entering a selection into the input device, the selected information is decrypted and the computer is enabled to use this information in accordance with the selected license. As noted above, the fee for the selected use license is added to the data log in association with the identity of the selected and retrieved information. Preferably also the selected use license is added to the information item itself.

As an example, the expanded use license may be for an entire computer network, rather than a single computer site. If unknown by the system, the computer can display a user query as to the number of computers on the computer network, so that the expanded use license may be made dependent upon the number of computers.

Similarly, the expanded use license may be made dependent upon the number of printers on the computer network.

Whether or not the computer is connected to a network, an expanded license may be provided to permit the selected, retrieved and decrypted information to be used with more than one application program. Alternatively, where the single site use license is for a limited period of time, the expanded use license may be for an extended period of time. Similarly, where the single site use license is for a limited number of uses of the selected information, the expanded use license may be for a larger number of uses of this information.

The multiple use licenses which are offered in accordance with the present invention lend themselves to determining a license fee for a so-called "encapsulated postscript". Thus, where a user wishes to license a font, an article or a graphic image to be incorporated in a publication which is distributed with either limited or wide circulation, the license fee can be adjusted to be commensurate with the circulation of the publication.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
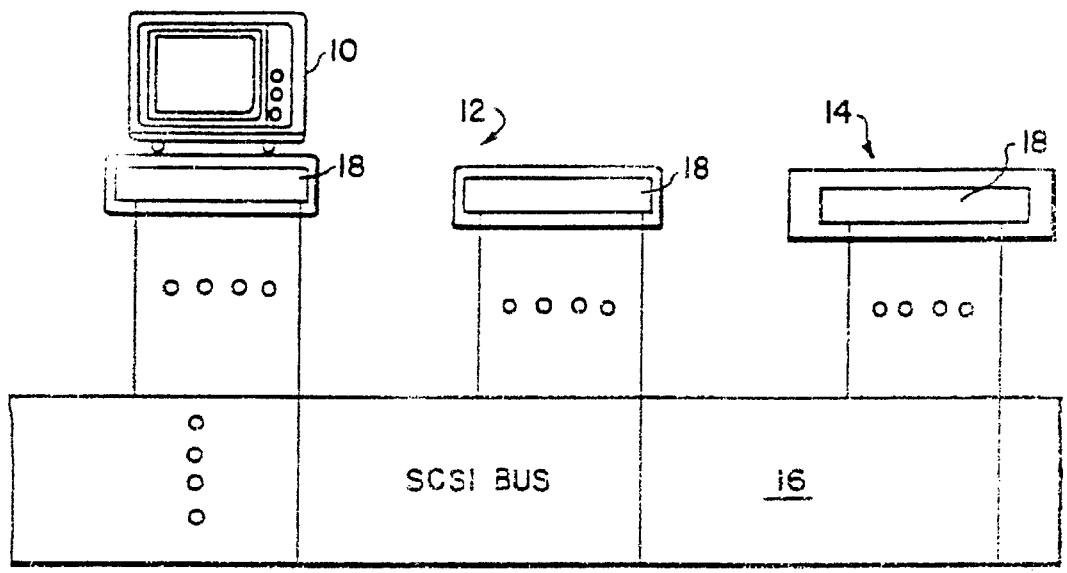
FIG. 1 is a representative diagram of a workstation comprising a personal computer (PC), a CD-ROM reader and a decryption controller all arranged on an SCSI bus.

The preferred embodiments of the present invention will now be described with reference to FIGS. 1–9 of the drawings. Identical elements in the various figures are designated with the same reference numerals.

FIG. 1 illustrates the general nature of the system according to one preferred embodiment of the present invention. As shown here, the system involves a digital computer workstation which is capable of retrieving secure information which is stored on one or more CD-ROMs.

In order to prevent unauthorized access to the stored information, at least some of the individual items of information ("information packets") are encrypted prior to storage on a CD-ROM. Some of the information packets may also be stored in decrypted (cleartext) form on a CD-ROM and can be retrieved by any workstation user by means of a CD-ROM reader. However, only an authorized user with a proper validated code and sufficient credit is allowed to decrypt the encrypted information packets.

Upon release of the secure and, if desired, the non-secure information to an authorized user, the user is charged a license fee set by the information provider (copyright owner or publisher of the information). This charge is effected automatically by debiting a financial deposit account which has previously been established between the user and the information provider.

To implement this system, there is provided a workstation comprising a personal computer (PC) 10, a CD-ROM reader 12 and a decryption controller 14. These three devices, which may be stand-alone devices each arranged in a separate enclosure or combined in one or two enclosures— e.g., the PC 10 in one enclosure and the CD-ROM reader 12 and controller 14 in another - are connected in a well-known manner to a Small Computer System Interface ("SCSI") bus 16 via a bus interface and controller 18.

The personal computer 10 and the CD-ROM reader 12 are conventional devices which are available commercially. The decryption controller is a special purpose device which operates to receive encrypted data from the CD-ROM reader, decrypt this data if authorized to do so, add a unique "brand code" to the data and transport the decrypted, branded data to the host computer 10 for storage either in its active memory (RAM) or hard disk drive.

The decryption controller also keeps a running account of the identity of, the brand code assigned to, and the charge for each information packet that is decrypted. This logged information is retained for later transmission, e.g. by telephone line, to a central billing facility at a remote site.

Once an information packet is decrypted, branded and transferred to the host computer 10, the workstation user can display it on the computer screen, print out a hard copy and/or transmit a copy by LAN or modem to another workstation.

In accordance with the SCSI standard, the SCSI bus extends no more than twenty-six feet in length from end to end and is provided with terminating impedances at each end. Each unit arranged on the bus is provided with a unique address from a maximum of eight addresses (zero to seven). The computer is usually given the address number seven; the addresses of the other devices on the bus may be selected from zero to seven with a manual switch arranged on each device.

In the preferred embodiment of the present invention, the decryption controller 14 is disposed in its own enclosure, separate and apart from the personal computer 10 and possibly also the CD-ROM reader 12. To safeguard the firmware and codes which are used by the electronic circuitry, the decryption controller may be provided with light-sensitive, erasable memory circuits so that the contents of memory are erased if and when the enclosure is opened.

Figure 2:
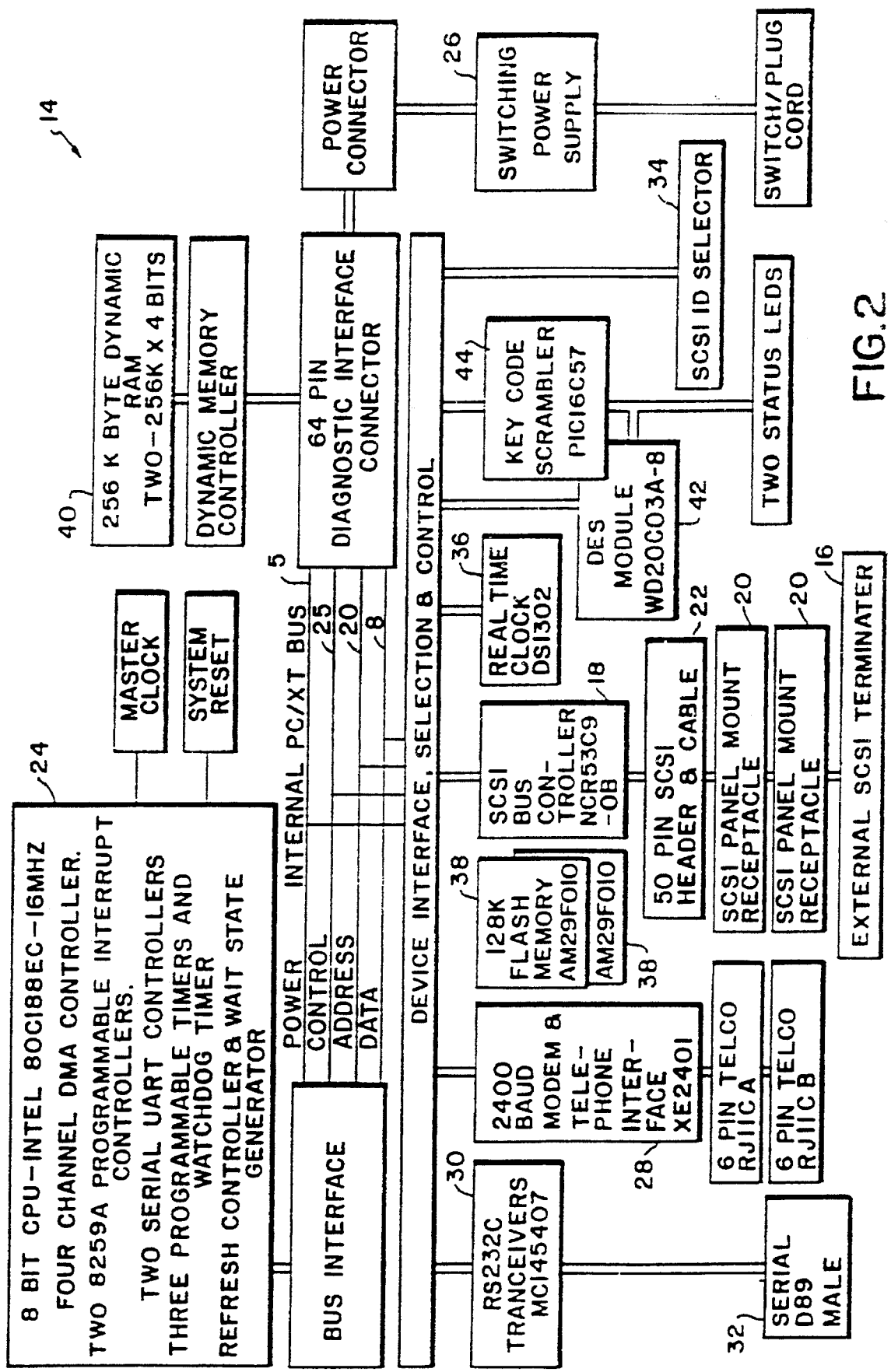
FIG. 2 is a block diagram of a decryption controller for use in the system of FIG. 1.

FIG. 2 shows the preferred embodiment of the decryption controller. This device is connected to the SCSI bus 16 via receptacles 20 and a fifty pin header 22. The SCSI bus controller 18 operates in conjunction with a CPU 24 to receive requests for data from the host computer 10 and initiate requests for this data from the CD-ROM reader 12.

The device is provided with its own separate power supply 26 so that it operates completely independently of the host computer 10.

The decryption controller is also provided with a 2400 baud modem and telephone interface 28 so that it may communicate with a central billing computer at a remote site. This central billing computer routinely calls the decryption controller 18 at regular intervals—for example, each night—to download the logged information concerning each information packet (IP) that was decrypted, and/or to credit the financial account maintained by the decryption controller when the workstation user makes payment.

Among the items logged and downloaded to the central computer are the identity of, and the "brand codes" assigned and affixed to each information packet that was decrypted.

The decryption controller works closely in conjunction with the host computer to select and log the license fee charged for each information packet that was decrypted. As will be described in detail below, the user may be offered a basic license fee for a single site license, or a higher fee for an expanded use license. The user is prompted to select the use license of his choice and the fee associated with this selection is logged and eventually downloaded to the central computer.

The decryption controller 18 can also communicate with other devices, such as printers or the like, by means of an RS-232C transceiver 30 and an associated serial port connector 32.

The SCSI address is set from zero to six by a manual ID selector 34. Date and time are provided by a real time clock 36.

Firmware for the decryption controller is provided on two 128K flash memory chips 38; intermediate scratch pad storage is provided by a 256K dynamic RAM 40.

Decryption of encrypted data is effected by a Data Encryption Standard (DES) module 42 which operates in conjunction with a key code scrambler 44. The key code scrambler maintains the keys used by the DES module for decryption. Alternatively, the decryption function and/or the key code scrambler function may be implemented in software (firmware) operating in the CPU 24.

All keys utilized by the system are created and maintained in the decryption controller so that neither the workstation user nor the PC 10 will have access to these keys.

All of the electronic circuit devices contained in the decryption controller of FIG. 2 are standard, commercially available devices. Part numbers are shown in FIG. 2 for the major components.

In a preferred embodiment of the invention, the system of FIG. 1 and, in particular, the decryption controller of FIG. 2, operates in the manner shown by the flow charts of FIGS. 3, 4 and 6–8.

Figure 3:
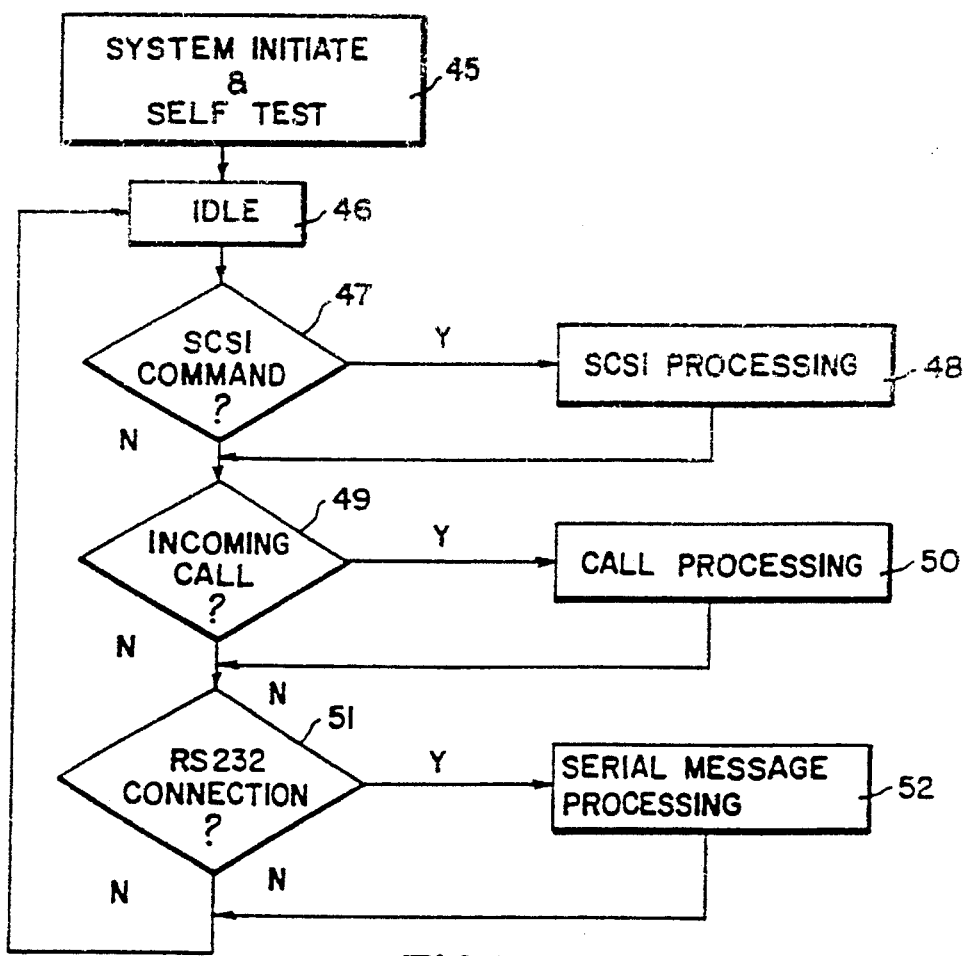
FIG. 3 is a flow chart showing the general operation of the decryption controller of FIG. 2.

When first switched on, the CPU 24 executes a self-test routine as is conventional in the art (Block 45 in FIG. 3). Error messages are communicated to the host computer via the SCSI bus for display to the system user. Thereafter, the CPU enters the idle mode (Block 46) and awaits an interrupt.

If the decryption controller receives an SCSI command from the host computer (Block 47) it processes this command (Block 48) as will be described hereinafter in connection with FIG. 4. If the decryption controller receives an incoming telephone message (Block 49) from a central billing computer, it processes this message (Block 50) before proceeding. Typical telephone messages are set forth in Table I:

TABLE II

Set Credit (in financial account)
Set Item Price
Set User Password
Clear Financial Account to Zero
Get Financial Account Information
Get User Information
Create User Information
Remove User Information
Send User a Message Similarly, if an RS232 connection is established (Block 51), permitting communication either to or from the decryption controller, the controller either transmits information, for example to a printer, or receives a serial message of the type noted above. In this case, the serial message is processed (Block 52) and the controller returns to the idle state.

Figure 4:
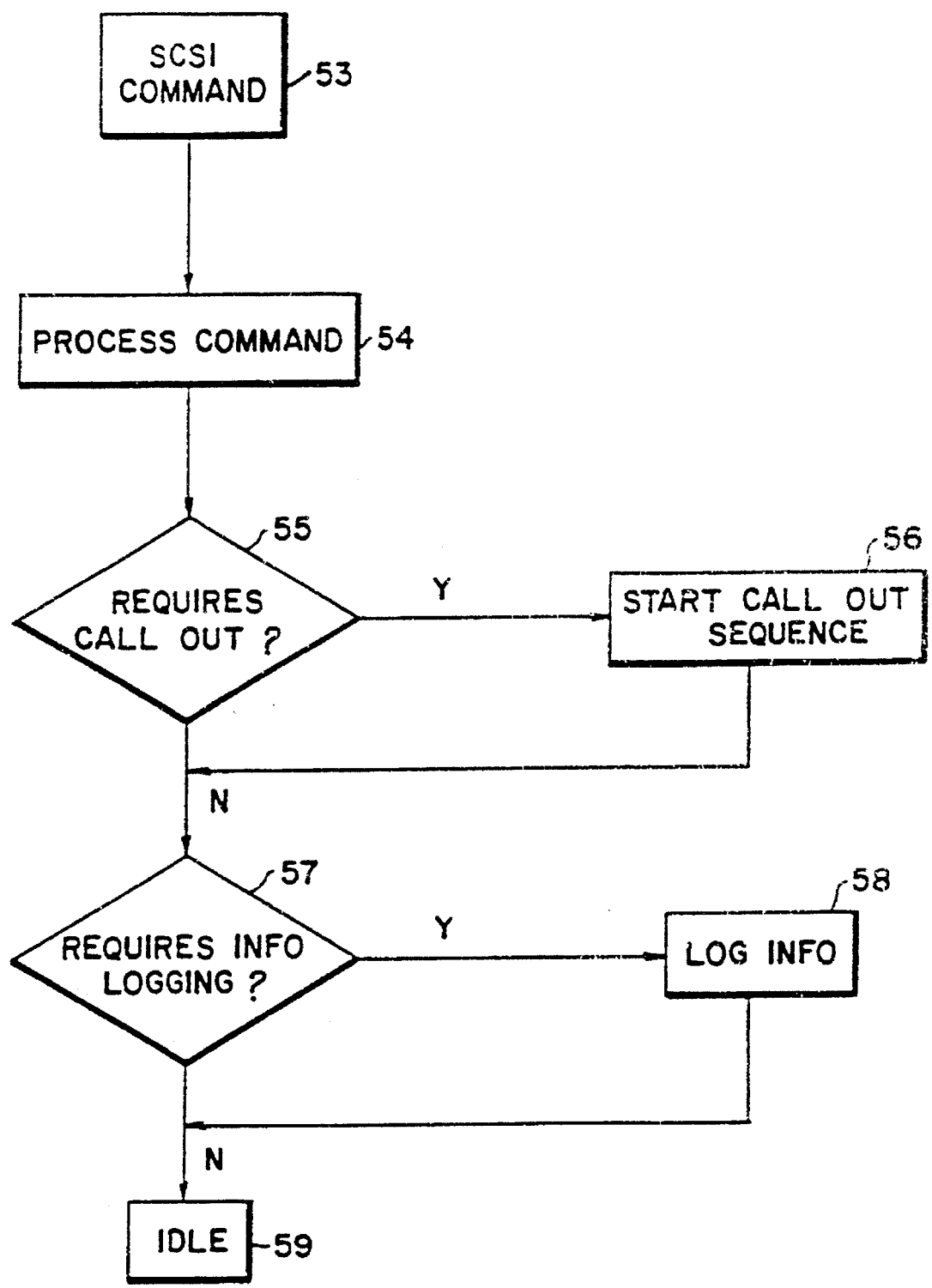
FIG. 4 is a flow chart showing the operation of the decryption controller of FIG. 2 in response to an SCSI command from the host computer, including the logging of information such as a brand code.

FIG. 4 illustrates how an SCSI command from the host computer is treated by the decryption controller. When an SCSI command is received (Block 53) it is analyzed and processed (Block 54) by the decryption controller. Typical SCSI commands are set forth in Table II:

TABLE III

Get Financial Account Information

Get Purchased Item Information (identity, brand code, license type and fee)

Assent/Don't Assent to Purchase Item

Log In

Log Out

Poll for an Asynchronous Event (such as an "on sale" notice)

Set User's Default Billing Reference (e.g., last billing reference number used)

Purchase Item

Get Decryption Controller Status (i.e., error codes)

Get User Information (i.e., currently logged-in user)

Receive Decrypted Data

Certain PC commands require the decryption controller to call the central billing computer via the telephone modem. For example, if the financial account is decremented to zero, the decryption controller will automatically call and request additional credit. In this case, the decryption controller makes the call (Block 55) and executes the call-out sequence (Block 56). In the call-out protocol, the decryption controller dials the number of the central billing facility and transmits both its telephone and identification (ID) numbers. This simple transmission requests an immediate call-back from the central computer during which the financial account is automatically updated.

Each telephone transaction, initiated by the central billing computer, preferably comprises three steps:

(1) A download to the central billing facility of the current financial account status, all billing transactions completed (information packets purchased) since the previous download, and the user information stored in the decryption controller;

(2) A transmission from the central billing facility to the decryption controller of any updates, such as changes in pricing information and the like; and (3) A communication of all error codes from the decryption controller to the central billing facility which indicate that the decryption controller is not functioning properly.

In addition, the financial account balance in the decryption controller can be updated by the central billing facility. It can be credited, if payment was made to the central billing facility by the user, or debited, for example if a check was returned from the bank marked "insufficient funds".

Each billing transaction provided to the central billing facility preferably contains, at a minimum, the following information:

TABLE IV

Time and Date of Decryption

Identification No. of Information Packet (IP)

Volume No. of CD-ROM

Information Owner or Distributor of IP

Type of IP (Classification)

License Type Selected and License Fee Paid

Billing Reference, if inserted by the User

Brand code affixed to IP

When an item (IP) is purchased by a user, and the decryption controller is able to complete this transaction by decrementing the financial account and decrypting the item, this transaction is logged into the flash memory 38 of the controller. In this case, the logging operation is flagged (Block 57) and carried out (Block 58) at the completion of the transaction. Thereafter, the decryption controller returns to the idle mode (Block 59).

If several types of use licenses are available for a particular information package, the decryption controller provides this information, along with the fee for each type of license, to the host computer to permit selection by the user. Once the user selects a particular use license, the associated fee is logged in the decryption controller memory.

Figure 5:
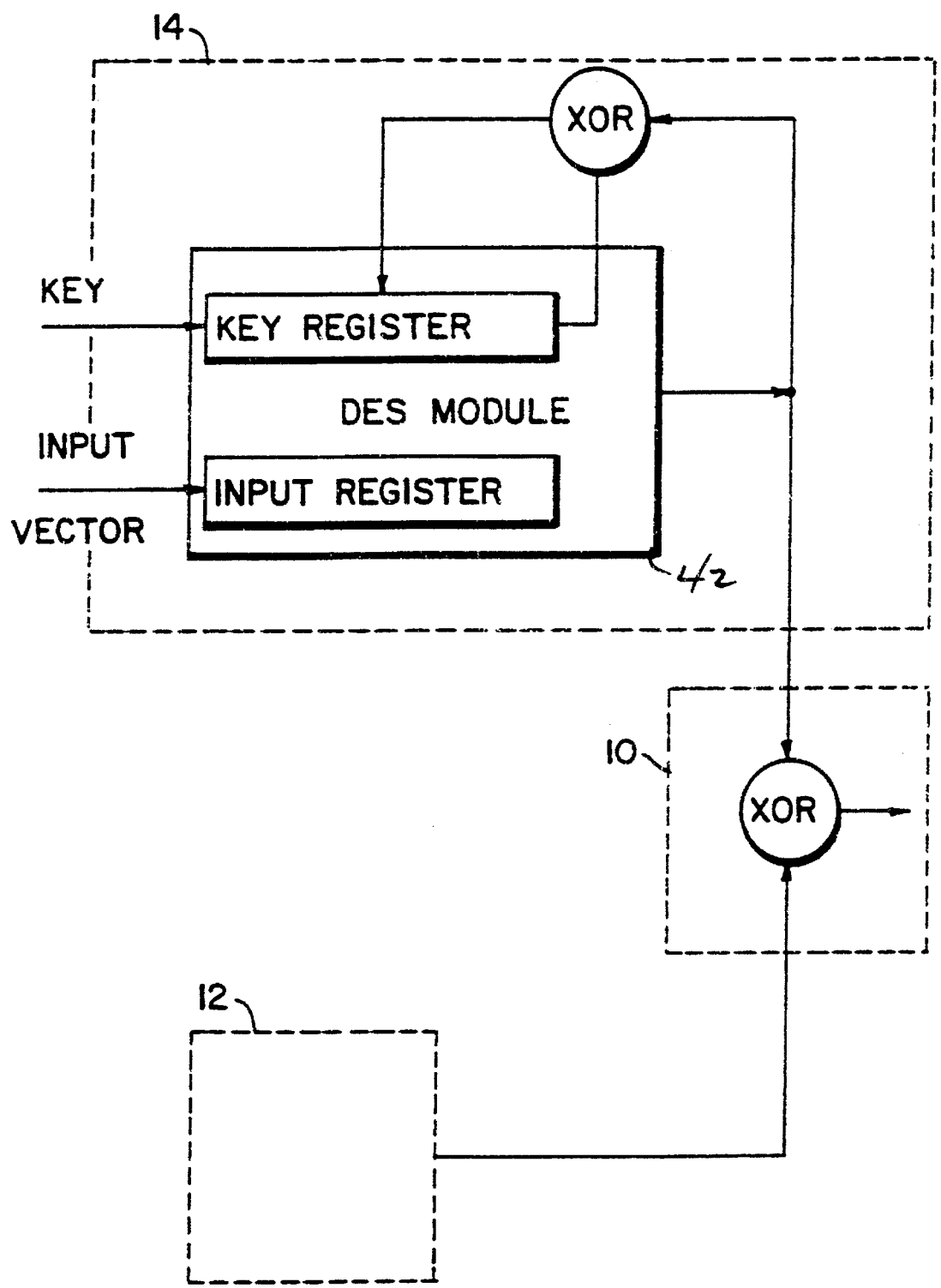
FIG. 5 is a block diagram showing the data flow in one preferred embodiment of the invention.

FIG. 5 illustrates the flow of data in the decryption of an information packet in one preferred embodiment of the invention. As shown therein, the DES module 42 in the decryption device 14 is supplied an initial key for the key register and an initial input vector for the input register. Both the key register and input register are 64 bits (8 bytes) in length. The DES module generates a 64 bit bitstream which is transmitted to the host computer 10. This bitstream is also fed back and combined with the key in the key register with a binary exclusive-OR operation. This procedure is known in the art as "cypher feedback".

The DES module repeats the process of producing a 64 bit output with each new key that is entered into the key register. This procedure continues until the bitstream generated is equal in length to the encrypted information packet retrieved by the CD-ROM reader 12.

The decryption bitstream and the encrypted information packet, received by the host computer 10, are combined, bit by respective bit, with a binary exclusive-OR operation to produce the information packet in cleartext.

Figure 6:
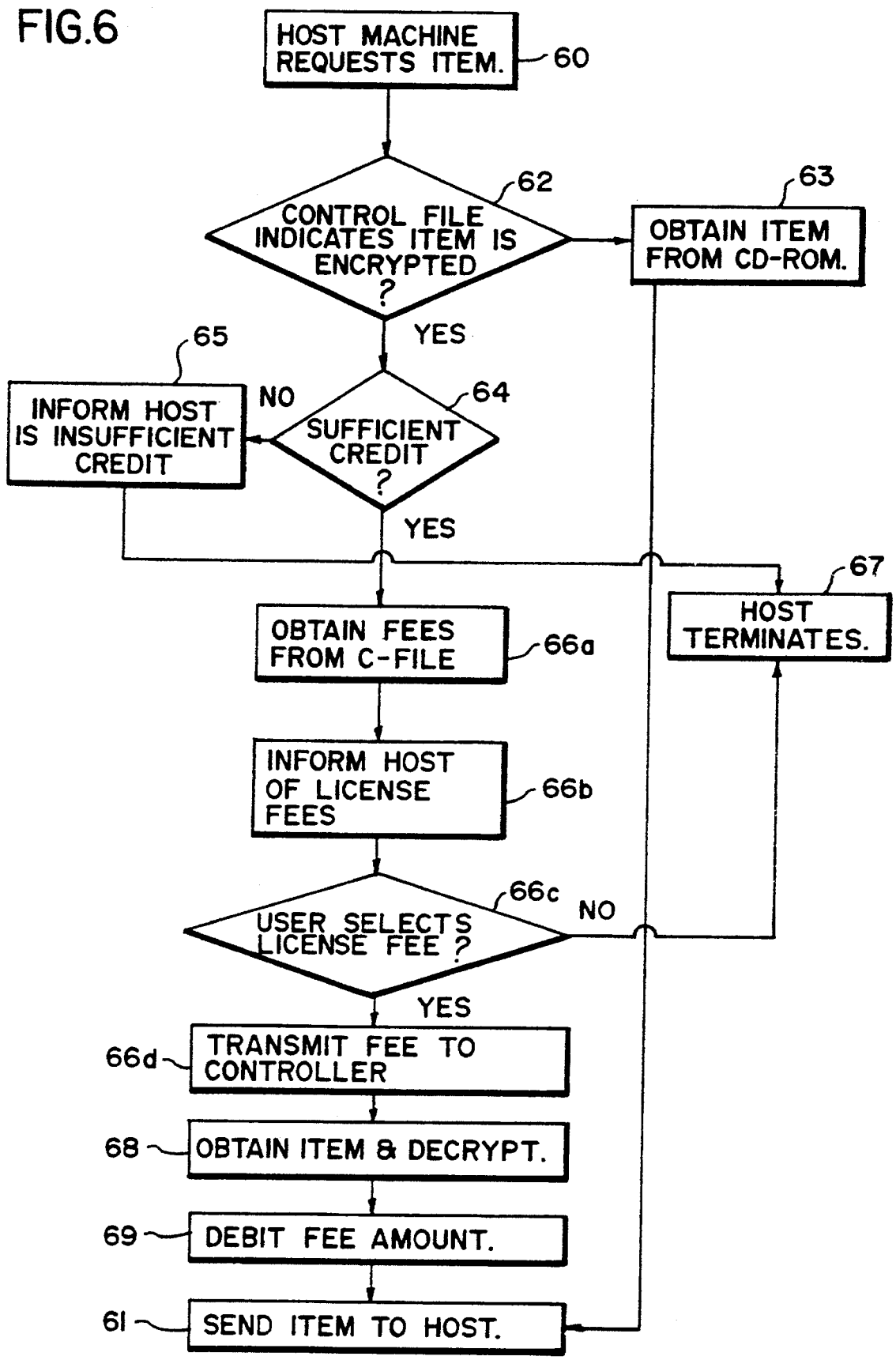
FIG. 6 is a flow chart showing the operation of the decryption controller in response to an SCSI command to retrieve an item of information, including applying a brand code to decrypted information and requesting a user response to a choice of use licenses.

Referring to FIG. 6, the retrieval of an item (IP) commences with a request by the host computer 10 (Block 60). The host computer sends this request to the decryption controller 14 via the SCSI bus which processes the request and then sends the item to the host (Block 61), as if it were the CD-ROM reader. The host computer 10 thus addresses the decryption controller, rather than the CD-ROM reader; however, with the exception of this difference, the host computer operates in such a manner as if it were requesting the item (IP) directly from the CD-ROM reader. Thus, as far as the host computer 10 is concerned, the decryption controller is the CD-ROM reader; i.e., it is indistinguishable from, and "transparent" to the host computer.

The decryption controller initially reads in the entire control file of the CD-ROM. Thereafter, it queries this file to determine whether the information item (IP) is encrypted (Block 62). If not, the decryption controller initiates a data request from the CD-ROM reader 12 (Block 63) in the same manner as if it were the host computer and reads the item into its own RAM memory. Thereafter, the data item is transferred to the host computer (Block 61).

If the control file indicates that the desired item is encrypted, the decryption controller checks the user's financial account to determine if there is a sufficient, minimum positive balance to pay for the item (Block 64). If not, the decryption controller informs the host computer of the insufficient credit (Block 65) or of the amount of the credit, and the transaction is terminated (Block 67).

If credit is sufficient, the fees for the different use licenses are obtained from the CD-ROM control file, stored in the decryption controller (Block 66a). According to the invention, the control file, which is in cleartext form, includes the fees associated with each type of use license (site license). The decryption controller passes these license fees to the host computer (Block 66b) for display on the computer screen. The host computer displays the type and fee of each site license on its display screen and awaits the selection of a use license by the user.

If the user does not confirm the purchase of the information packet by selecting one of the offered licenses, the transaction is terminated (Block 67).

If the computer user confirms the acceptance of the item at the license fee indicated, the computer transmits the selected fee to the decryption controller (Block 66d) and the controller initiates a data request to the CD-ROM reader. The item is thus caused to be read by the CD-ROM reader and it is transferred to the RAM of the decryption controller. Thereafter, the item is decrypted using the DES module and the decryption keys (Block 68). The fee for the selected license of the item is then debited from the user's financial account (Block 69) and the decrypted item is transferred to the host computer (Block 61). Once the item of information has been supplied to the host computer in decrypted form, it is available for storage, both temporary and archival storage, and may be read and copied by the user, as desired, in accordance with the selected license.

Figure 7:
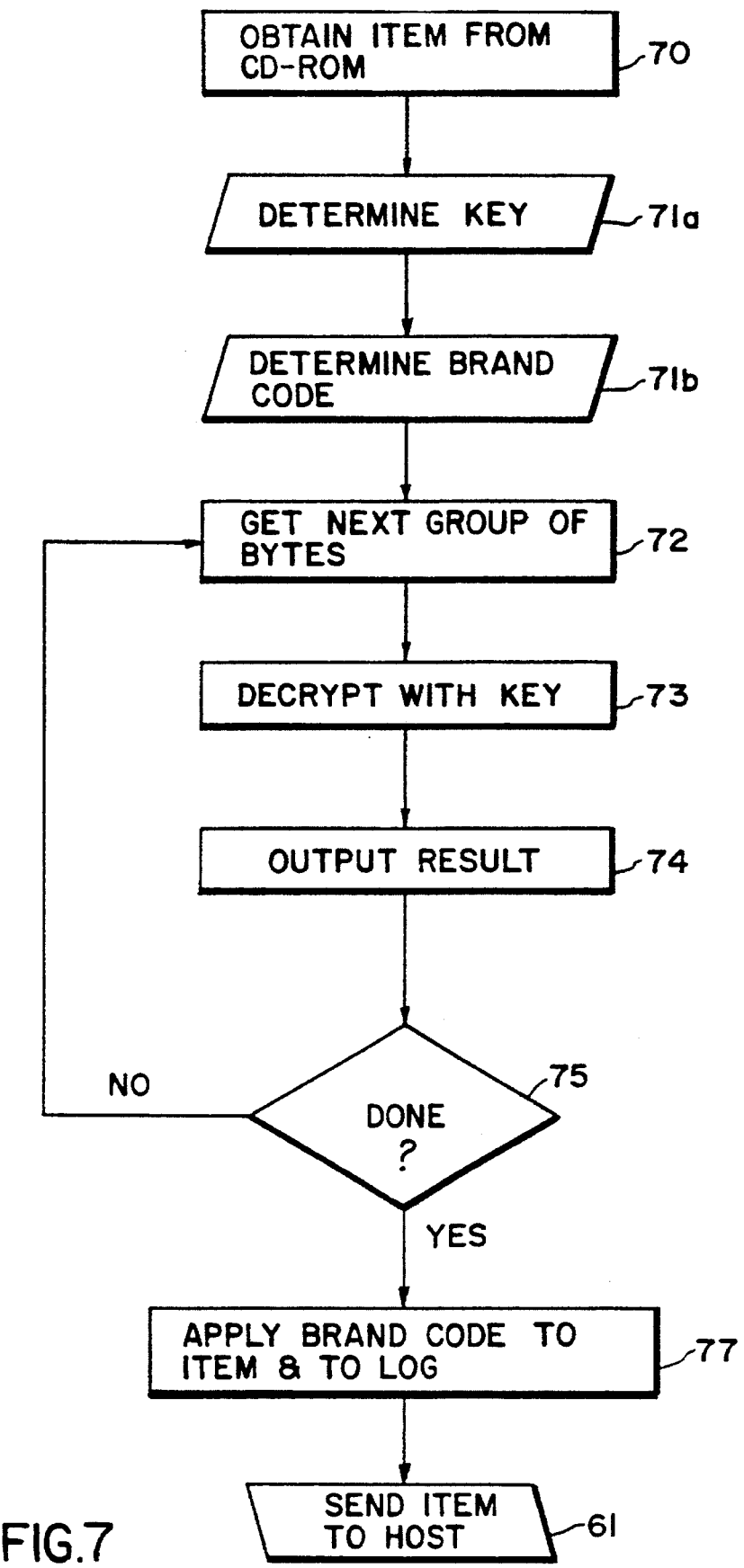
FIG. 7 is a flow chart showing the operation of the system of FIG. 1, and particularly the decryption controller, in decrypting selected information and applying a brand code.

FIG. 7 illustrates the detailed operation of the decryption controller of FIG. 2 in decrypting an item of information. As such, FIG. 7 represents the operation of Block 68 in FIG. 6.

As an initial step, the controller obtains the entire item of information (in encrypted form) from the CD-ROM (Block 70). Thereafter, the controller determines the decryption key (Block 71a) for this item from key rules and key data which are available (e.g., stored) locally. Preferably, each separate item of information has a unique decryption key. The method of determining this key is unimportant to the present invention and will not be described in detail. Suffice it to say that any known way of generating, storing or transmitting a key may be used.

Once the key is determined, the decryption controller also determines the brand code to be applied to the item of information. This brand code is preferably a plurality of numbers which include the date and time of retrieval and an error detection code, such as a checksum. The error detection code makes it possible to determine, at a later time, if the brand code has been changed.

Since the DES module 42 of the decryption controller processes (decrypts) only eight bytes of data at a time, a first group of eight bytes for the information item to be decrypted is initially transferred to the DES circuit (Block 72) and decrypted (Block 73). The result of this decryption—that is, the cleartext—is placed temporarily in RAM (Block 74) and the process is repeated (Block 75) until all bytes of data of the information item are decrypted.

Either following, during or prior to decryption, the brand code is applied to the item of information in a standard location, or locations prescribed by the copyright owner of the information item. This brand code is also added to the data log contained in the decryption controller (Block 77). Finally, the entire information item in cleartext is transmitted to the host computer (Block 61).

In the preferred embodiment of the present invention, the brand code is added to the information item during the decryption process. When the item is encrypted, the copyright owner must identify the area or areas within the text at which the brand code is placed. Prior to or during encryption, filler bits (a series of ones and/or zeros) are placed in these areas. Thereafter, when the encrypted information item is decrypted in the manner illustrated in FIG. 5, a decryption bitstream is generated by the decryption device 14 which is equal in length to the information item to be decrypted. During this process, the unique brand code bit pattern is placed in the brand code areas. In the final step, when the decryption bitstream is combined using a binary exclusive-OR operation with the encrypted information item, the final output will be cleartext with the brand codes inserted in the specified areas.

The copyright owner may specify one or more areas within the information item for location of the brand code. These areas are preferably not at the beginning and/or end of the information packet because such locations can be easily identified. Rather, the brand code is preferably embedded at repeated intervals at specific locations within the information packet.

According to a further feature of the present invention, the brand code is generated within the decryption controller by combining two or more of the following items of data:

TABLE V

Serial Number of Decryption Controller Device
Time and Date
Serial Number or Random Number
Site License Option The site license option (SLO) selected by the user in advance of decryption may be included in the brand code so that it is always possible to determine, at a later time, whether the information item is being used in accordance with the license.

Figure 8:
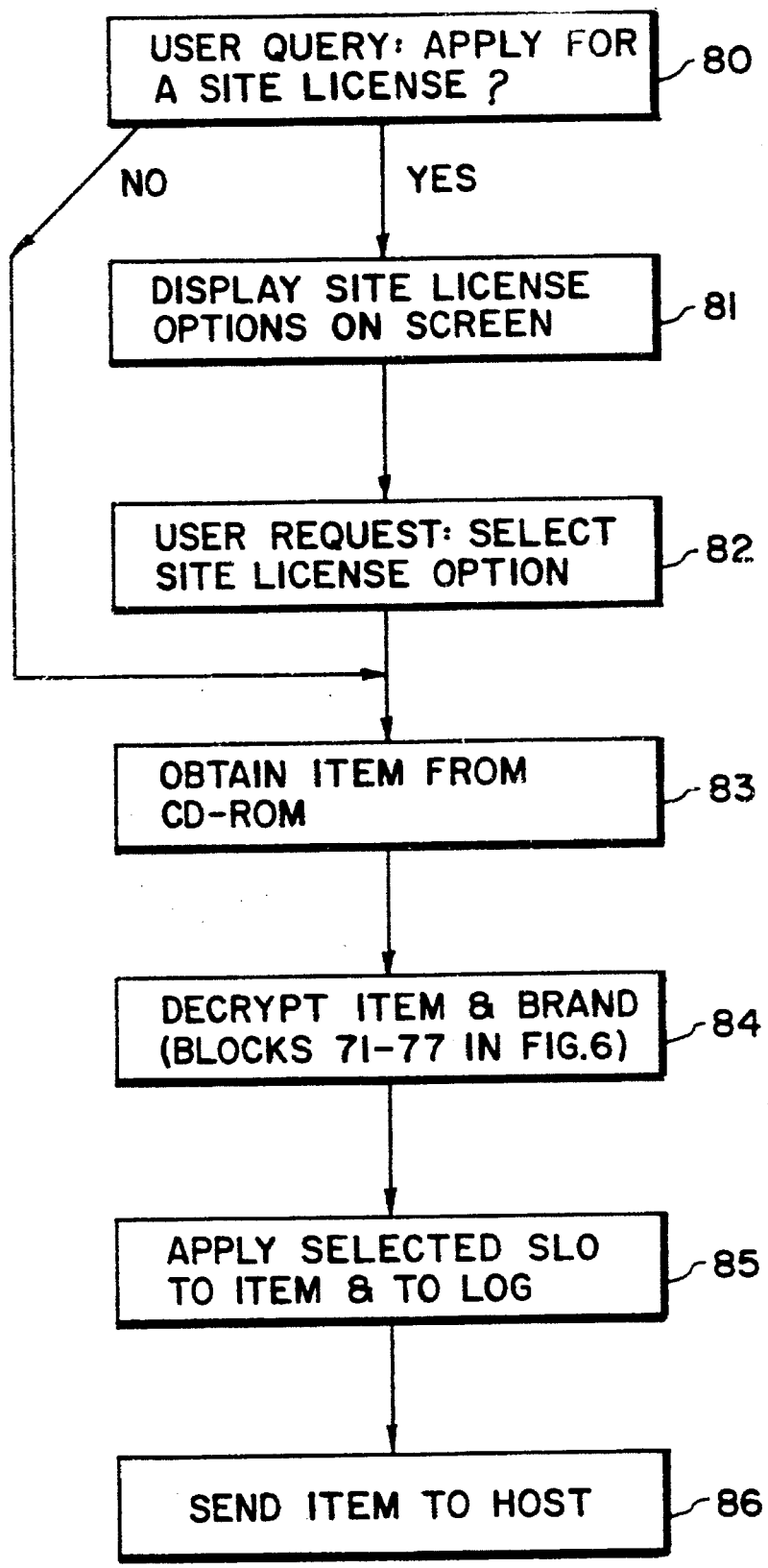
FIG. 8 is a flow chart showing the operation of the system of FIG. 1 in selecting a use license before decrypting selected information.

FIG. 8 illustrates the process for selecting a user license. As indicated in FIG. 6, the host computer displays a query on the screen for the user: Does the user wish to apply for a site license? (Block 80). If so, the site license options are displayed on the screen (Block 81) with a request to the user: Select one of the site license options (Block 82). Once a site license option (SLO) has been selected, the controller proceeds to obtain the item from a CD-ROM (Block 83) and thereafter to decrypt the item and apply the brand code (Block 84) as indicated in Blocks 71–77 in FIG. 6. Thereafter, the selected site license option (SLO) is also applied to the item as well as to the data log (Block 85) within the decryption controller. Finally, the item is sent to the host computer (Block 86).

It will be understood that the present invention is susceptible to implementation in a large variety of embodiments. For example, in the apparatus of FIG. 1, the CD-ROM reader 12 may be replaced by a retrieval device of some other mass storage medium, such as a magnetic storage medium. For example, it is possible to distribute secure information to a local site—e.g., by sending CD-ROMS, by transmission via the telephone network, by satellite broadcast or the like—for recording and storage on a mass storage medium at the local site. By way of example, this mass storage medium may be a magnetic drum, a magnetic disk pack, a DASD or the like.

Figure 9:
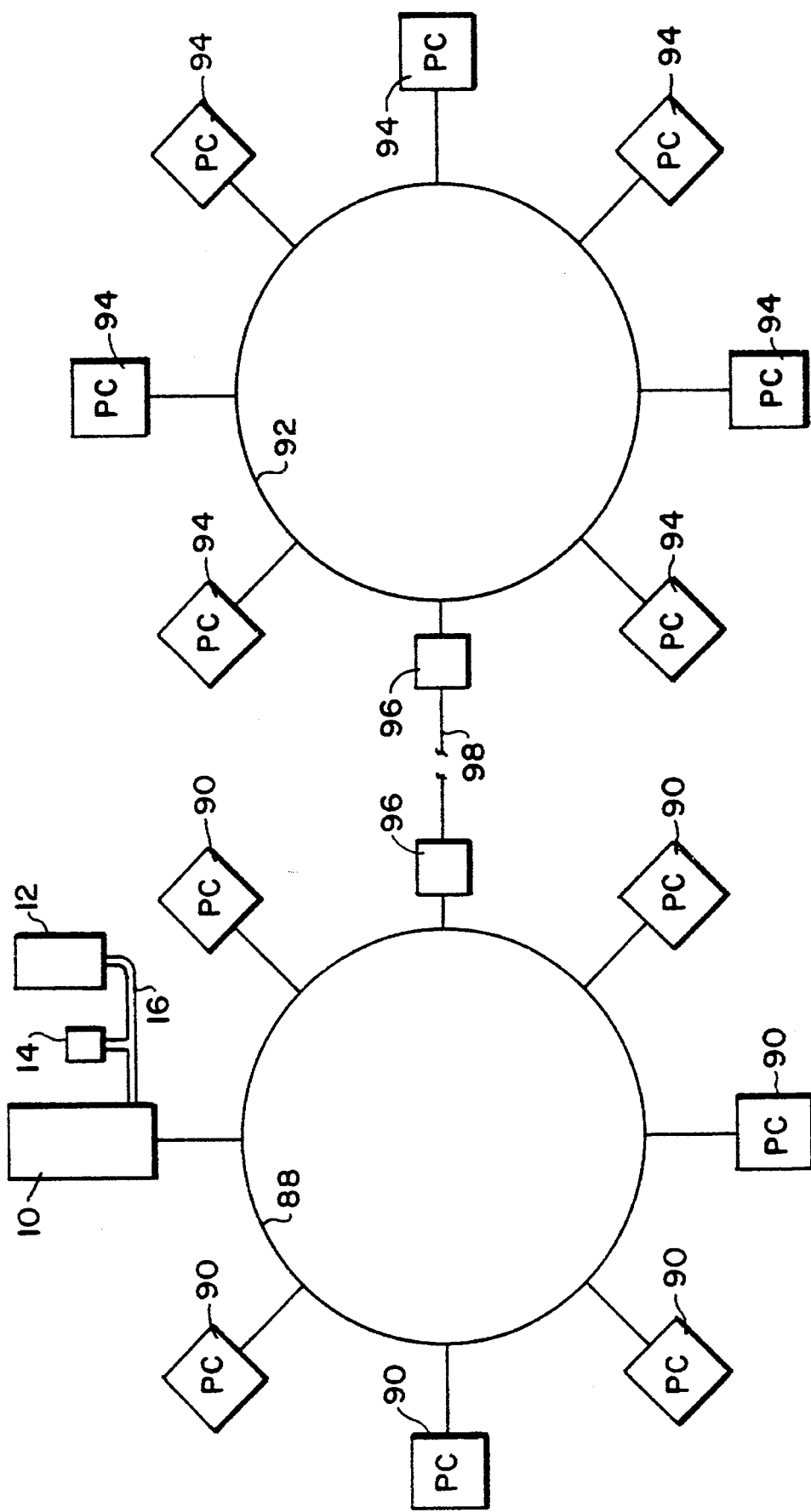
FIG. 9 is a block diagram of a wide area network (WAN) containing two local area networks (LAN's), one of which is provided with a LAN server in accordance with the present invention.

FIG. 9 illustrates an environment wherein the apparatus of FIG. 1, or a modified version thereof, is employed as a local area network (LAN) server. In this case, the computer 10 is connected onto an LAN—e.g., token ring—88 as are PCs 90. Such an arrangement avoids the necessity of providing a separate decryption controller 14 at each PC site.

In fact, the LAN server comprising the computer 10, mass storage medium 12, decryption controller 14 and the SCSI bus 16 may also serve a wide area network (WAN) comprising the LAN 88 and one or more additional LANs 92 which support PCs 94. The LAN 92 is connected to the LAN 88 via suitable communication interfaces 96 and a transmission line 98. In this way, any one of the PCs 90 and 94 are able to obtain information from the LAN server 10–16 which forms the "secure information source".

There has thus been shown and described a novel system for retrieving secure information from a mass storage medium which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In apparatus for retrieving information from a secure electronic information source, wherein at least some of said information is in encrypted form and are decrypted for use; and wherein said apparatus comprises:

(a) a control device for selecting information to be retrieved from said information source;

(b) an information retrieval device, coupled to said control device, for retrieving said selected information from said information source;

(c) a decryption device, coupled to said control device, for decrypting at least portions of said selected information retrieved from said information source; and (d) a data logging device, coupled to said control device, for maintaining a data log of said selected information as it is retrieved from said information source and decrypted;

the improvement comprising the method steps of automatically electronically:

(1) adding a unique brand code to at least some of said selected and decrypted information; and (2) adding said brand code to said data log in association with the identity of said selected and decrypted information;

whereby at least some of said selected and decrypted information includes a brand code.

2. The method defined in claim 1, wherein said brand code is a plurality of alphanumeric characters.

3. The method defined in claim 2, wherein said brand code includes a serial number.

4. The method defined in claim 2, wherein said brand code includes the date of retrieval of the information with which it is associated.

5. The method defined in claim 2, wherein said brand code includes the date and time of retrieval of the information with which it is associated.

6. The method defined in claim 2, wherein said brand code includes a representation of the site license option selected by the user.

7. The method defined in claim 2, wherein said brand code includes an error detection code for detecting errors in the remainder of the brand code.

8. The method defined in claim 1, wherein said brand code is added to said selected and decrypted information at at least one prescribed location between the beginning and end thereof, thereby to make removal of said brand code difficult for the user.

9. The method defined in claim 1, wherein said brand code is added to said selected and decrypted information at a plurality of locations therein, thereby to make removal of said brand code difficult for the user.

10. The method defined in claim 1, further comprising the step of adding an error detecting code to said selected and decrypted information with said brand code, thereby to determine whether said brand code has been removed.

11. The method defined in claim 1, wherein said selected and decrypted information has a plurality of sections, and wherein a brand code is added to each of said sections.

12. The method defined in claim 1, wherein said apparatus further comprises a remote central computer and a communication link for transmitting data from said data log to said central computer, and wherein said method further comprises the step of transmitting to said central computer each brand code associated with said selected and decrypted information.

13. The method defined in claim 12, wherein said log includes an identifier of each unit of said selected and decrypted information, and wherein said transmitting step includes the step of transmitting to said central computer both the identifier and brand code of said selected and decrypted information.

14. The method defined in claim 13, wherein said log further includes a user charge of each unit of said selected and decrypted information, and wherein said transmitting step includes the step of transmitting to said central computer said user charge along with said identity and brand code of said selected and decrypted information.

15. The method defined in claim 13, wherein said log further includes the date on which each unit of said selected and decrypted information was retrieved, and wherein said transmitting step includes the step of transmitting to said central computer said date along with said identity and brand code of said selected and decrypted information.

16. The method defined in claim 12, wherein said transmitting step is performed each time that a selected information is retrieved and said brand code is added thereto.

17. The method defined in claim 12, wherein said transmitting step is performed at periodic intervals.

18. The method defined in claim 12, wherein said control device is a computer which runs at least one application program having identification data associated therewith; wherein said selected and decrypted information is used by said computer in connection with said application program and wherein said transmitting step includes the step of transmitting to said central computer both said identification data and said brand code of said selected and decrypted information.

19. The method defined in claim 1, wherein said information source is a mass storage medium.

20. The method defined in claim 1, wherein said mass storage medium is a CD-ROM.

* * * * *